United States Patent

Bernard et al.

[11] Patent Number: 6,154,082
[45] Date of Patent: Nov. 28, 2000

[54] PROJECTION DEVICE AGAINST ELECTROSTATIC DISCHARGES

[75] Inventors: Patrick Bernard, Poisat; Christophe Garnier, Theys; Michaël Tchagaspanian, Echirolles, all of France

[73] Assignee: STMicroelectronics S.A., Gentilly, France

[21] Appl. No.: 09/374,379

[22] Filed: Aug. 13, 1999

[30] Foreign Application Priority Data

Aug. 18, 1998 [FR] France ................................. 98 10476

[51] Int. Cl.$^7$ .................................................. H03K 5/08
[52] U.S. Cl. ............................ 327/310; 327/318; 327/324
[58] Field of Search ................................. 327/309, 313, 327/314, 315, 318–322, 324, 325, 326, 310

[56] References Cited

U.S. PATENT DOCUMENTS

| | | | |
|---|---|---|---|
| 4,801,824 | 1/1989 | Fellinger et al. | 327/318 |
| 4,858,055 | 8/1989 | Okitaka | 327/318 |
| 4,875,130 | 10/1989 | Huard | 327/318 |
| 5,525,933 | 6/1996 | Matsuki et al. | 327/309 |
| 5,942,931 | 8/1999 | Yanai | 327/314 |

*Primary Examiner*—Toan Tran
*Attorney, Agent, or Firm*—Theodore E. Galanthay; Allen, Dyer, Doppelt, Milbrath & Gilchrist, P.A.

[57] ABSTRACT

A device for the protection of an integrated circuit input/output pin against electrostatic discharges includes a first diode between a positive power supply line and an internal connection node for connection to the pin, and a second diode between the internal node and a second negative or zero supply line. The device also includes a protection transistor series-connected between the positive power supply line and the first diode, and a stack of N diodes, where N is equal to one or more, series-connected between the control electrode of the protection transistor and the first diode.

26 Claims, 3 Drawing Sheets

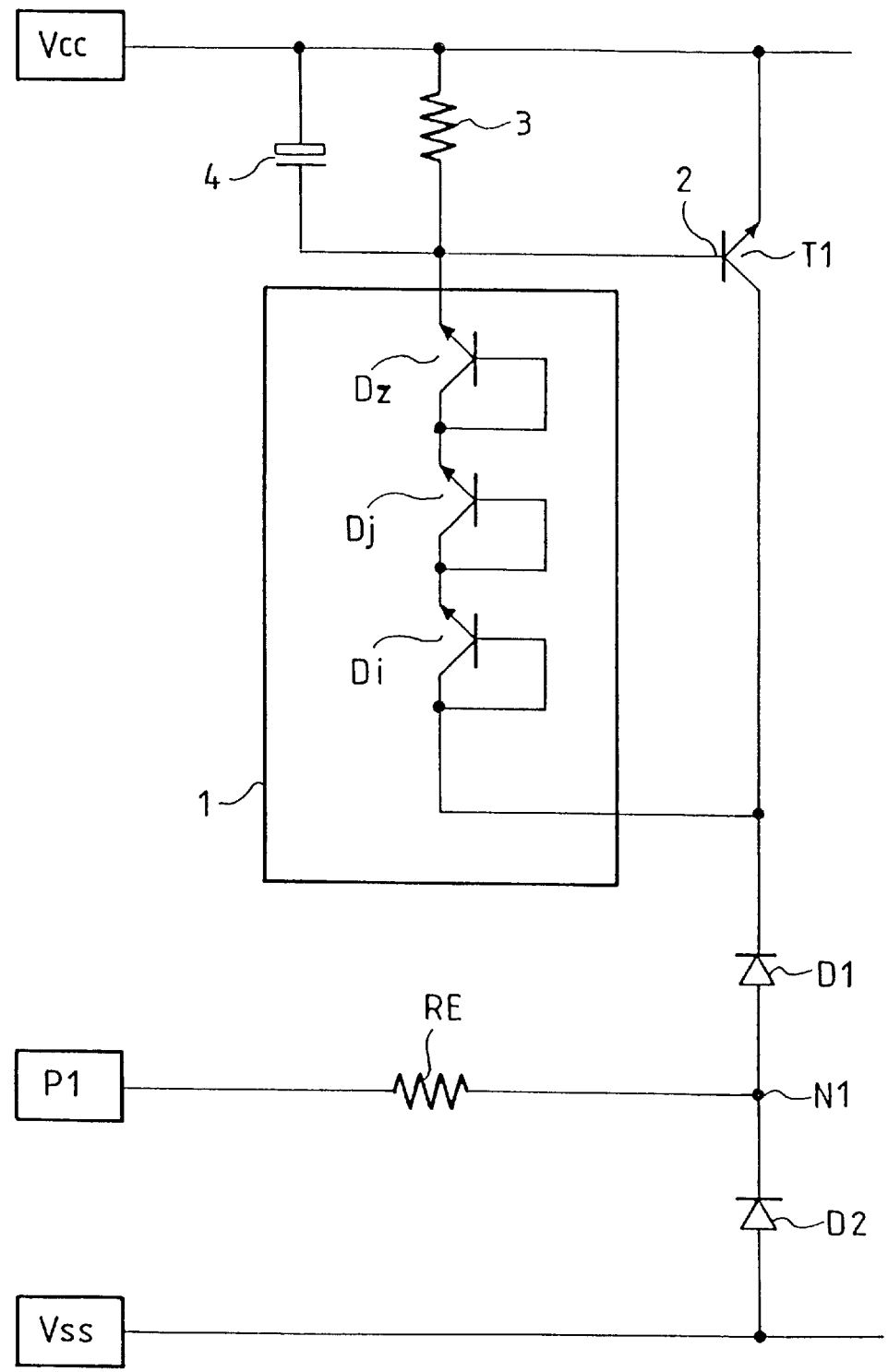
FIG_2b

PROJECTION DEVICE AGAINST ELECTROSTATIC DISCHARGES

FIELD OF THE INVENTION

The present invention relates to the field of integrated circuits, and, more particularly to protecting integrated circuits against electrostatic discharges.

BACKGROUND OF THE INVENTION

A need to protect integrated circuits against electrostatic discharges is known. These electrostatic discharges occur in particular when the integrated circuits are not under power, for example when they are being manually handled. The discharges occur between two external pins. This is why protection devices are usually provided. They are placed on each input/output pin of the integrated circuit, and enable both the clamping of the voltage and the flow of the charges without destroying the integrated circuit or allowing the integrated circuit to be damaged.

A prior art protection device as shown in FIG. 1 comprises, on each input/output pin of the integrated circuit, two series-connected diodes D1 and D2 as shown on the pin P1 in the example. One of the diodes, D1, is between an internal point N1 of connection to the pin and an internal positive power supply line A. The other diode, D2, is between an internal negative or zero power supply line B and the same internal connection point N1.

If the power supply potentials applied to the lines A and B are respectively Vcc, between 3 and 5 volts for example, and Vss, equal to zero volts, and if Vd1 and Vd2 denote the threshold voltage of the diodes D1 and D2, the voltages applied to the pin P are limited by the protection device to Vcc+Vd1 in positive terms and Vss−Vd2 in negative terms. This limiting, while it is satisfactory in the context of protection against electrostatic discharges, may prove to be highly inconvenient in operation.

Indeed, this limiting also takes place in an operational mode. In certain applications, the voltage applied in the operational mode to certain input/output pins of an integrated circuit may go beyond the level of a power supply voltage. An exemplary application in which voltage levels going beyond the level of a power supply voltage are used operationally, relates to the field of radio frequencies.

In certain radio-frequency applications, a reference signal is used in reception with respect to a virtual ground. For reasons of coupling capacitance, this virtual ground may be chosen in particular to be equal to the level of the positive supply voltage, Vcc in the example. A signal is then received at a pin of the integrated circuit. The DC value of this signal is linked to the level of the positive supply voltage Vcc and its AC value oscillates around this DC value. In the operational mode, the instantaneous value of the voltage at the associated pin will therefore regularly go beyond the level of the positive supply voltage Vcc. If the device of FIG. 1 for protection against electrostatic discharges is placed on this pin in the operational mode, then this device will get activated. The integrated circuit therefore cannot fulfill its function. The prior art protection device is therefore not compatible with applications of this type.

SUMMARY OF THE INVENTION

An object of the invention is to provide a device which protects against electrostatic discharges that does not have the drawbacks of the prior art.

The invention includes placing a protection transistor between the diode D1 and the positive power supply line, and connecting a stack of N series-connected diodes between the control electrode of the transistor and the diode D1, where N is at least equal to one. In practice, the number N of diodes of the stack depends on the threshold with respect to Vcc at which it is desired that the protection transistor should get activated. Preferably, the protection transistor used is a bipolar type transistor.

The invention therefore relates to a device for the protection of an input/output pin of an integrated circuit against electrostatic discharges. The device includes a first diode D1 between a positive power supply line and an internal connection node for connection to the input/output pin and a second diode between the internal node and a second negative or zero supply line. According to the invention, the device further includes a protection transistor series-connected between the positive power supply line and the first diode. Also, a stack of N diodes, where N is at least equal to one, are series-connected between the control electrode of the protection transistor and the first diode.

BRIEF DESCRIPTION OF THE DRAWINGS

Other characteristics and advantages of the invention are described in detail in the following description, given by way of an embodiment that is not intended to restrict the scope of the invention and made with reference to the appended drawings, of which:

FIGS. 2a and 2b are schematic diagrams of a device for protection against electrostatic discharges applied to an integrated circuit pin according to the present invention;

DETAILED DESCRIPTION OF THE PREFERRED EMBODIMENTS

Figure 1:
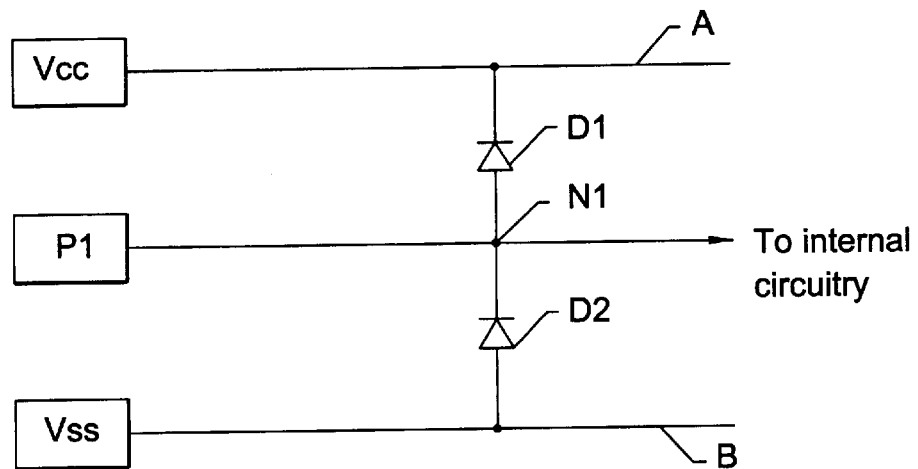
FIG. 1 is a schematic diagram of a device for protection against electrostatic discharges applied to an integrated circuit pin according to the prior art.
Figure 2A:
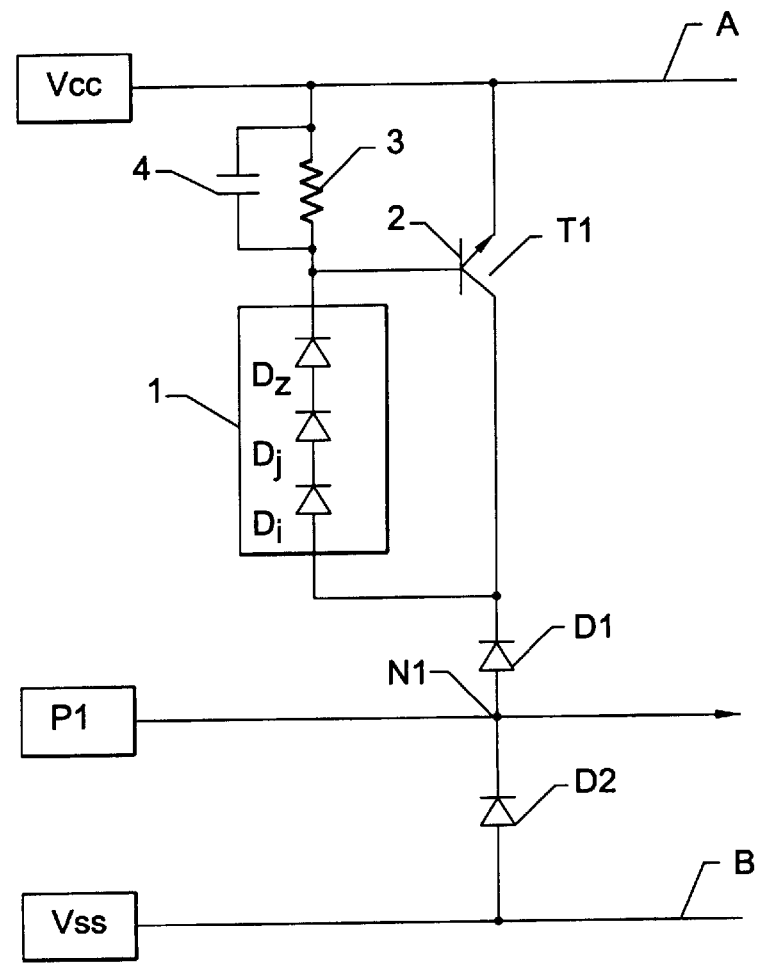

FIG. 2a shows a protection device according to the present invention applied to an integrated circuit input/output pin P1. It comprises a diode D2 between the internal connection node N1 of the pin P1 and the negative or zero power supply line B. This diode is normally reverse-biased. It has its cathode connected to the node N1 and its anode connected to the line B.

The device further comprises a protection transistor T1 and a diode D1 series-connected between the positive power supply line A and the internal connection node N1. Preferably, and as shown, the protection transistor T1 is a bipolar transistor, for example, an NPN type transistor. Its collector is connected to the positive power supply line A and its emitter is connected to the cathode of the diode D1. The diode D1 is normally reverse-biased. Its anode is connected to the internal node N1.

A stack 1 of N series-connected diodes Di, Dj, Dz are connected between the diode D1 and the control electrode 2. These N diodes are, like the diode D1, normally reverse-biased. The first diode Di has its anode connected to the cathode of the diode D1 while the last diode Dz has its cathode connected to the control electrode 2 of the protection transistor T1. In the example, since it is a bipolar transistor, this control electrode is the base. A resistor 3 is provided between the positive power supply line A and the control electrode 2. The diodes of the stack 1 are in practice identical, with a threshold voltage referenced Vd.

In normal operation, so long as the voltage at the pin P1 is below Vcc+Vd1+N*Vd, no current flows into the series circuit formed by the resistor 2, the stack 1 and the diode D1. The transistor T1 is off. In the event of an electrostatic discharge on the input/output pin P1, the voltage at this pin goes beyond the level Vcc+Vd1+N*Vd. The stack 1 of the N diodes and the diode D1 then let through the current. This leads to conditions on the control electrode 2 that are sufficient to activate the protection transistor T1. The discharge current then goes through this protection transistor T1, which offers very low resistance, and the diode D1. In practice, the transistor T1 is sized to withstand a typical discharge current. Also, there is a capacitor 4 provided and parallel-connected to the resistor 3. In the event of discharge, it assists in the activation of the structure formed by the diodes Di, Dj, Dz and the transistor T1.

In practice, the diodes D1, D2 and the N diodes of the stack are not necessarily made with the same technology. With regard to the diodes D1 and D2, a technology is chosen that preferably provides the lowest possible equivalent capacitance so as to minimize the equivalent capacitance of the pin P1 as experienced from the internal circuitry of the integrated circuit. This requirement can also be found for example in radio-frequency applications. It is possible, for example, to make the diode D2 by a PN junction of the bipolar transistor base type. The diode D1 could be made according to a similar technique.

The diodes of the stack do not have the same requirements. In practice, it is possible to make them of bipolar transistors as shown in FIG. 2b, each diode being formed by a bipolar transistor whose base and emitter are short circuited. FIG. 2b also shows a alternative embodiment of the protection device in which there is provided a current limitation resistor RE placed between the pin P1 and the internal connection node N1.

Figure 3:
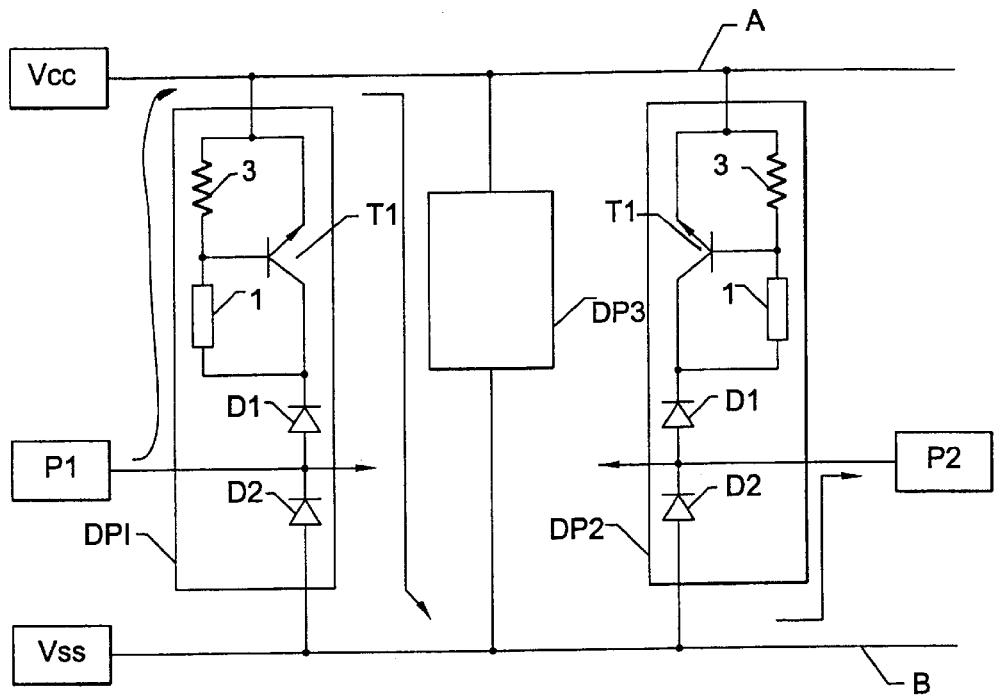
FIG. 3 is a block diagram illustrating the principle of the protection of an integrated circuit against electrostatic discharges.

FIG. 3 shows the general principle of protection of an integrated circuit against electrostatic discharges. A discharge takes place between two input/output terminals of the integrated circuit. The input/output terminals P1 and P2 have an associated protection device added to each, identical to that of FIG. 2a. We thus have the device DP1 for the pin P1 and the device DP2 for the pin P2. There is further provided a clamping device DP3, connected between the two power supply lines A and B. The role of this clamping device is to provide a path of least resistance in the integrated circuit in the event of electrostatic discharge. Thus, it is certain that the discharge current will flow through this path of least resistance and not damage the integrated circuit.

For example, if the electrostatic discharge results in a positive surge voltage on the pin P1 and a negative surge voltage on the pin P2, the discharge current will flow through the diode D1 and the transistor T1 of the device DP1, through the clamping device DP3 and then through the diode D2 of the device DP2, as indicated by the arrows in FIG. 3, without damaging the integrated circuit. The protection device associated with each input/output pin of the integrated circuit according to the invention thus makes it possible to adjust the voltage clamping threshold by enabling the choice, for the stack 1, of an appropriate number N of diodes, at least equal to one, while at the same time dictating a path for the passage of the discharge current with only one transistor and one diode.

Finally, the equivalent capacitance experienced by the internal circuitry is only that due to the diodes D1 and D2, and to the metals used to make the contact on the pin, because the rest of the circuitry (transistor T1, stack 1 of N diodes) is series-connected with the diode D1. Thus, the protection device according to the invention makes no change in the capacitance experienced by the internal circuitry and therefore does not cause any deterioration in the characteristics of the integrated circuit. Hence, a very low equivalent capacitance is kept. This is very important for RF applications.

Figure 4:
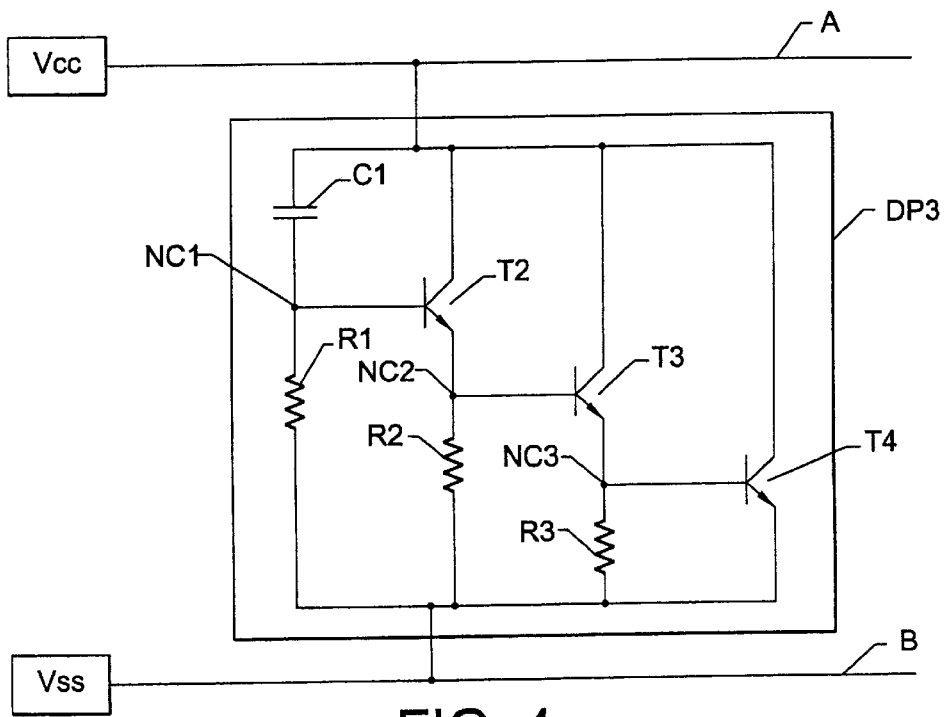
FIG. 4 is a detailed diagram of an embodiment of a clamping device used in the device of FIG. 3.

FIG. 4 shows an exemplary embodiment of the clamping device DP3 of FIG. 3. The function of the clamping device is to activate when a voltage threshold is crossed. The activation corresponds to a short-circuiting of the two power supply lines A and B. In this way, the discharge current necessarily passes through this short circuit. This prevents the integrated circuit from being damaged by a strong current in the substrate.

The example shown in FIG. 4 pertains to a dynamic clamping device, namely one that will activate only on a very fast voltage variation. It is also possible to make use of static clamping devices which are well known. The advantage of using a dynamic clamping device lies in its speed of activation. The dynamic clamping device shown in FIG. 4 thus comprises an activation stage comprising a capacitor C1 and a resistor R1, series-connected between the two power supply lines A and B, the connection point NC1 between the capacitor and the resistor providing an activation signal to a cascade structure of transistors. In the example, this cascade structure comprises three transistors T2, T3 and T4. A first transistor T2 is series-connected with a resistor R2 between the two power supply lines A and B. Its control electrode is connected to the connection point NC1. A second transistor T3 is series-connected with a resistor R3 between the two power supply lines A and B. Its control electrode is connected to the connection point NC2 between the first transistor T2 and the resistor R2. A third transistor T4 is connected between the two power supply lines A and B. Its control electrode is connected to the connection point NC3 between the second transistor T3 and the resistor R3.

In practice, the second transistor of the cascade structure, T3 in the example, is very wide. It is this transistor which, when it is on, offers the least resistance and will therefore be the main element that bears the discharge current.

In the example, and as shown in the figure, these transistors are NPN type bipolar transistors. The capacitor C1 then has a pin connected to the positive supply voltage. The other pin is connected to one pin of the resistor R1, the other pin of R1 being connected to the negative or zero power supply line B. Similarly, the transistors T2, T3, T4 each have their emitter connected to the positive power supply line and their collector connected to the negative supply voltage, by a resistor as the case may be. With MOS type transistors, an identical structure working in the same way is obtained. This structure is particularly efficient in terms of short circuits. The activation signal given by the connection point NC1 between the capacitor C1 and the resistor R1 almost instantaneously activates all the transistors in cascade.

That which is claimed is:

1. A device for the protection of an integrated circuit input/output pin against an electrostatic discharge, the device comprising:

a first diode connected between a first voltage supply line and the input/output pin;

a second diode connected between a second voltage supply line and the input/output pin;

a protection transistor connected in series between the first voltage supply line and the first diode; and at least one protection diode connected in series between a control electrode of the protection transistor and the first diode.

2. A device according to claim 1, further comprising a resistor connected between the first voltage supply line and the control electrode of the protection transistor.

3. A device according to claim 2, further comprising a capacitor connected in parallel with the resistor.

4. A device according to claim 1, wherein the protection transistor comprises a bipolar transistor.

5. A device according to claim 1, further comprising a current limitation resistor connected between the input/output pin and the first and second diodes.

6. A device according to claim 1, wherein a voltage of the first voltage supply line is positive, and a voltage of the second voltage supply line is negative or zero.

7. A device according to claim 1 wherein the at least one protection diode comprises a stack of protection diodes connected in series.

8. An integrated circuit comprising:

a first voltage supply line;

a second voltage supply line;

at least one input/output pin connected to the first and second voltage supply lines; and an electrostatic discharge protection device associated with each input/output pin and comprising a first diode connected between the first voltage supply line and the input/output pin, a second diode connected between the second voltage supply line and the input/output pin, a protection transistor connected in series between the first voltage supply line and the first diode, and at least one protection diode connected in series between a control electrode of the protection transistor and the first diode.

9. An integrated circuit according to claim 8, further comprising a clamping device connected between the first and second voltage supply lines.

10. An integrated circuit according to claim 9, wherein the clamping device comprises a dynamic clamping device.

11. An integrated circuit according to claim 10, wherein the clamping device comprises:

a capacitor and a resistor connected is series between the first and second voltage supply lines; and a plurality of transistors cascade connected between the first and second voltage supply lines, the plurality of transistors being activated by a control signal provided at a connection point between the capacitor and the resistor.

12. An integrated circuit according to claim 11 wherein the plurality of transistors comprises bipolar transistors.

13. An integrated circuit according to claim 11, wherein the plurality of transistors comprises MOS transistors.

14. An integrated circuit according to claim 8, wherein the electrostatic discharge protection device further comprises a resistor connected between the first voltage supply line and the control electrode of the protection transistor.

15. An integrated circuit according to claim 14, wherein the electrostatic discharge protection device further comprises a capacitor connected in parallel with the resistor.

16. An integrated circuit according to claim 8, wherein the protection transistor comprises a bipolar transistor.

17. An integrated circuit according to claim 8, further comprising a current limitation resistor connected between the input/output pin and the first and second diodes.

18. An integrated circuit according to claim 8, wherein a voltage of the first voltage supply line is positive, and a voltage of the second voltage supply line is negative or zero.

19. An integrated circuit according to claim 8, wherein the at least one protection diode comprises a stack of protection diodes connected in series.

20. A method for protecting an integrated circuit input/output pin against electrostatic discharges, the method comprising the steps of:

connecting a first diode between a first voltage supply line and the input/output pin;

connecting a second diode between a second voltage supply line and the input/output pin;

connecting a protection transistor in series between the first voltage supply line and the first diode; and connecting at least one protection diode in series between a control electrode of the protection transistor and the first diode.

21. A method according to claim 20, further comprising the step of connecting a resistor between the first voltage supply line and the control electrode of the protection transistor.

22. A method according to claim 21, further comprising the step of connecting a capacitor in parallel with the resistor.

23. A method according to claim 20, wherein the protection transistor comprises a bipolar transistor.

24. A method according to claim 20, further comprising the step of connecting a current limitation resistor between the input/output pin and the first and second diodes.

25. A method according to claim 20, wherein a voltage of the first voltage supply line is positive, and a voltage of the second voltage supply line is negative or zero.

26. A method according to claim 20, wherein the step of connecting at least one protection diode comprises connecting a stack of series-connected protection diodes in series between the control electrode of the protection transistor and the first diode.

* * * * *